United States Patent [19]
Suzuki et al.

[11] 4,222,588
[45] Sep. 16, 1980

[54] SEATBELT SYSTEM

[75] Inventors: Ichiro Suzuki; Masanao Motonami; Hisashi Ogawa, all of Aichi, Japan

[73] Assignee: Toyota Jidosha Kogyo Kabushiki Kaisha, Toyota, Japan

[21] Appl. No.: 37,157

[22] Filed: May 8, 1979

[30] Foreign Application Priority Data

Aug. 18, 1978 [JP] Japan .......................... 53-114160[U]

[51] Int. Cl.³ ............................................ B60R 21/10
[52] U.S. Cl. .................... 280/804; 16/107; 74/89.17; 105/29 R
[58] Field of Search .............. 280/804, 803, 802, 808; 74/89.17; 16/10, 102, 91, 92, 106, 107; 105/29 R, 127; 410/100, 103

[56] References Cited
U.S. PATENT DOCUMENTS

| | | | |
|---|---|---|---|
| 3,905,614 | 9/1975 | Lindblad | 280/803 |
| 4,053,175 | 10/1977 | Kato et al. | 280/803 |
| 4,061,365 | 12/1977 | Nagano et al. | 280/804 |
| 4,174,865 | 11/1979 | Doveinis | 296/146 |

*Primary Examiner*—John A. Pekar
*Attorney, Agent, or Firm*—Koda and Androlia

[57] ABSTRACT

A seatbelt system wherein the outer end of a passenger restraining belt is anchored to a runner piece which is guided by a guide rail fastened to the vehicle body. A runner gear mounted on the runner piece engages with a linear guide gear which is installed in the guide rail and a plurality of openings formed in a flexible tape. Flexible tape is driven in a direction of the length of the guide rail by means of a driving mechanism and when the flexible tape is driven, the running gear rolls along the guide gear to thereby cause the runner piece and the belt to move so that the belt approaches or move away from the passenger.

10 Claims, 5 Drawing Figures

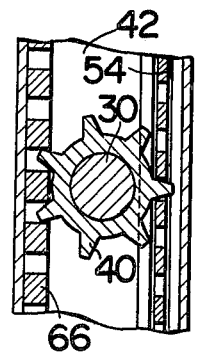
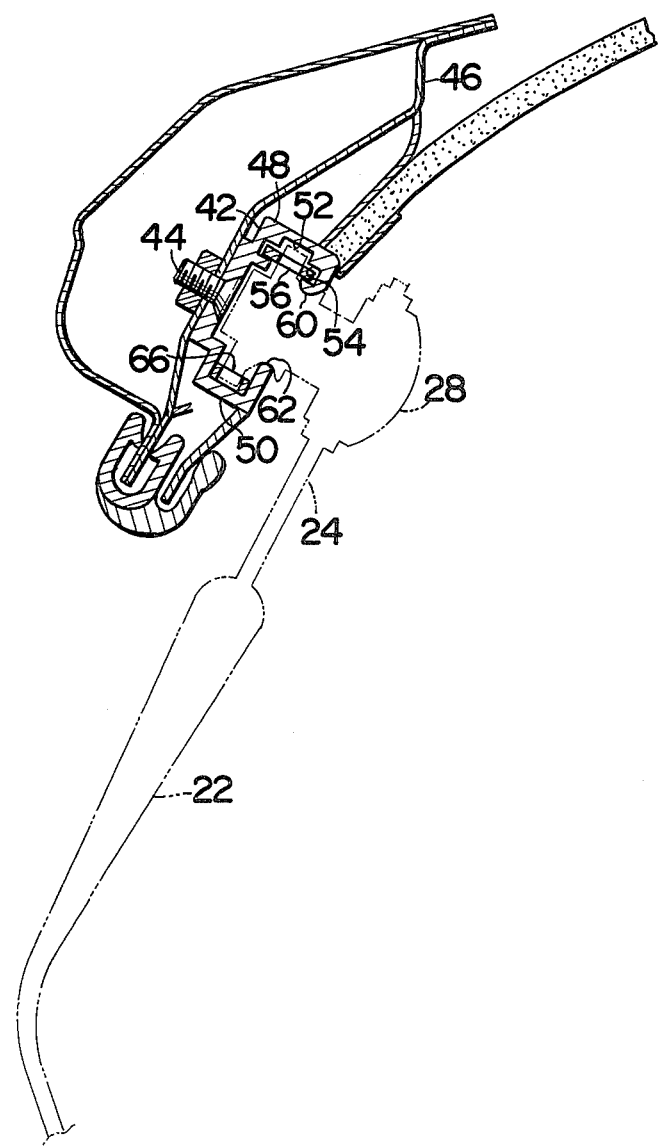

SEATBELT SYSTEM

BACKGROUND OF THE INVENTION

1. Field of the Invention

This invention relates to seatbelt systems and more particularly to seatbelt systems which make it possible to automatically fasten the passenger-restraining belt around the passenger after the passenger has seated himself in the vehicle.

2. Prior Art

Seatbelt systems restrain passengers during vehicular emergencies such as collision, et., and therefore, make it possible for a passenger to avoid colliding with dangerous objects within the vehicle. As a result, passenger safety is conspicuously improved. However, the percentage of passengers who wear seatbelts is extremely low because of the difficulty in fastening the belt, etc. As a result, various types of seatbelt systems have been proposed which makes it possible to automatically fasten the belt around the passenger after the passenger has seated himself in the vehicle.

Among such seatbelt systems, a common design is one in which the outer end of the passenger restraining belt is anchored to a runner piece and the belt is moved by moving the runner piece along a guide rail fastened to the vehicle body. In this way, the belt is caused to approach or move away from the passenger seat so that the belt is automatically fastened around or removed from the passenger. During a vehicular emergency, however, a large belt tension is transmitted to the belt guide which supports the runner piece. Accordingly, it is necessary that the guide rail be strong. However, it is also necessary to provide space in the guide rail for the installation of various transmission parts which transmit the driving force of a motor, etc. to the runner piece. As a result, the size or the guide rail has been conspicuously increased. This decreases the amount of passenger space available in the vehicle and increases the danger that the passenger collide with a part of the system projecting into the passenger compartment.

SUMMARY OF THE INVENTION

Accordingly it is a general object of the present invention to provide a seatbelt system which is strong and sufficiently able to support the belt tension during a vehicular collision while being compact and only projecting slightly into the passenger compartment.

It is another object of the present invention to provide a seatbelt system which is simple in design.

It is still another object of the present invention to provide a seatbelt system whose operation is quiet.

In accordance with the principles of the present invention, a unique seatbelt system is provided in which a runner gear is mounted on a runner piece which anchors the outer end of the belt. The belt is caused to move by causing the runner gear to roll along a guide rail. In order to cause revolution of the runner gear, a guide gear and a thick tape are provided within the guide rail. The runner gear is rotated by the sliding motion of the thick tape.

BRIEF DESCRIPTION OF THE DRAWINGS

The above mentioned features and objects of the present invention will become more apparent with reference to the following description taken in conjunction with the accompanying drawings wherein like reference numerals denote like elements and in which:

FIG. 3 is a cross sectional view along the line III—III in FIG. 2;

FIG. 4 is a cross sectional view along the line IV—IV in FIG. 1; and

DETAILED DESCRITPION OF THE INVENTION

Figure 1:
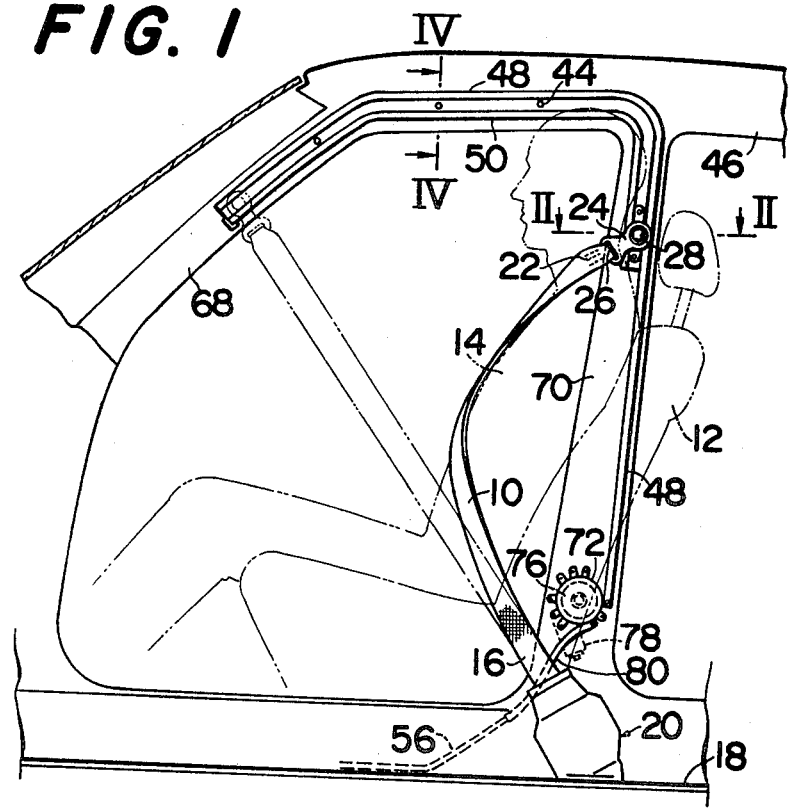
FIG. 1 is a side view from the vehicle interior of one embodiment of the seatbelt system in accordance with the teachings of the present invention.

Referring more particularly to the figures, shown in FIG. 1 is a seatbelt system in accordance with the teachings of the present invention. In FIG. 1, the seatbelt system includes a passenger restraining belt 10 fastened diagonally across the passenger 14 who is seated in the seat 12. Therefore, the passenger 14 is restrained by the belt 10. The inner end 16 of the belt 10 is retracted with a predetermined amount of force by a retractor mechanism 20 which is fastened to the floor 18 of the motor vehicle. The retractor mechanism 20 contains an inertial locking mechanism which abruptly stops the extension of the belt 10 only during a vehicular emergency.

Figure 2:
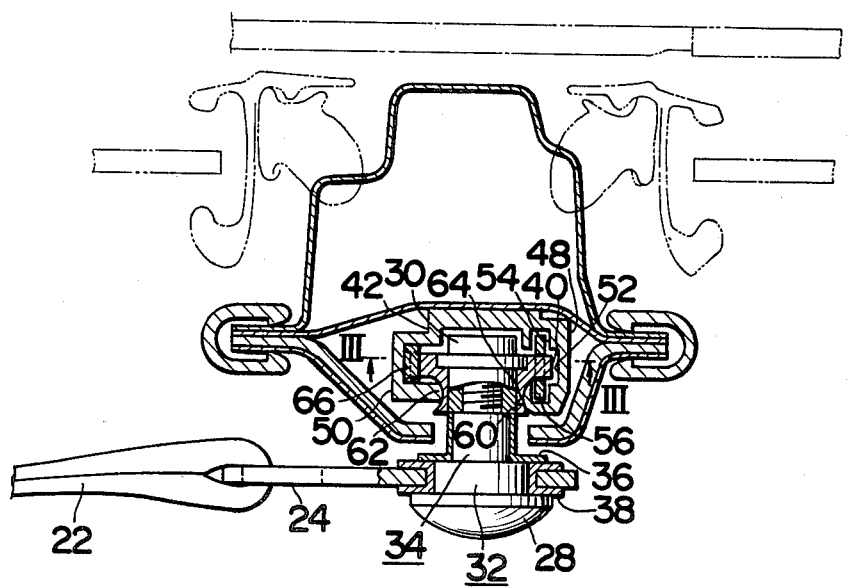
FIG. 2 is a cross sectional view along the line II—II in FIG. 1.

The outer end 22 of the belt 10 is anchored by being folded back on itself through a slot 20 in an anchor plate 24. As is shown in FIG. 2, the anchor plate 24 is fastened to a runner piece 30 by means of an anchor bolt 28. The intermediate portion of the anchor bolt 28 is formed so that the diameter of the bolt is increased in two steps, i.e. so that the intermediate portion is divided into two sections which have different diameters. The two diameters are a large diameter section 32 and a small diameter section 34. A spacer 36 which is L-shaped in cross section fits over the small diameter section 34 of the anchor bolt 28 while a spacer 38 which is U-shaped in cross section is fitted over the large diameter section 32. The anchor plate 24 is thus free to rotate about the anchor bolt 28.

The runner piece 30 into which the anchor bolt 28 is screwed is cylindrical in shape and a runner gear 40 is mounted on the circumference of the runner piece 30. The runner piece 30 and the runner gear 40 are provided within a guide rail 42.

Figure 5:
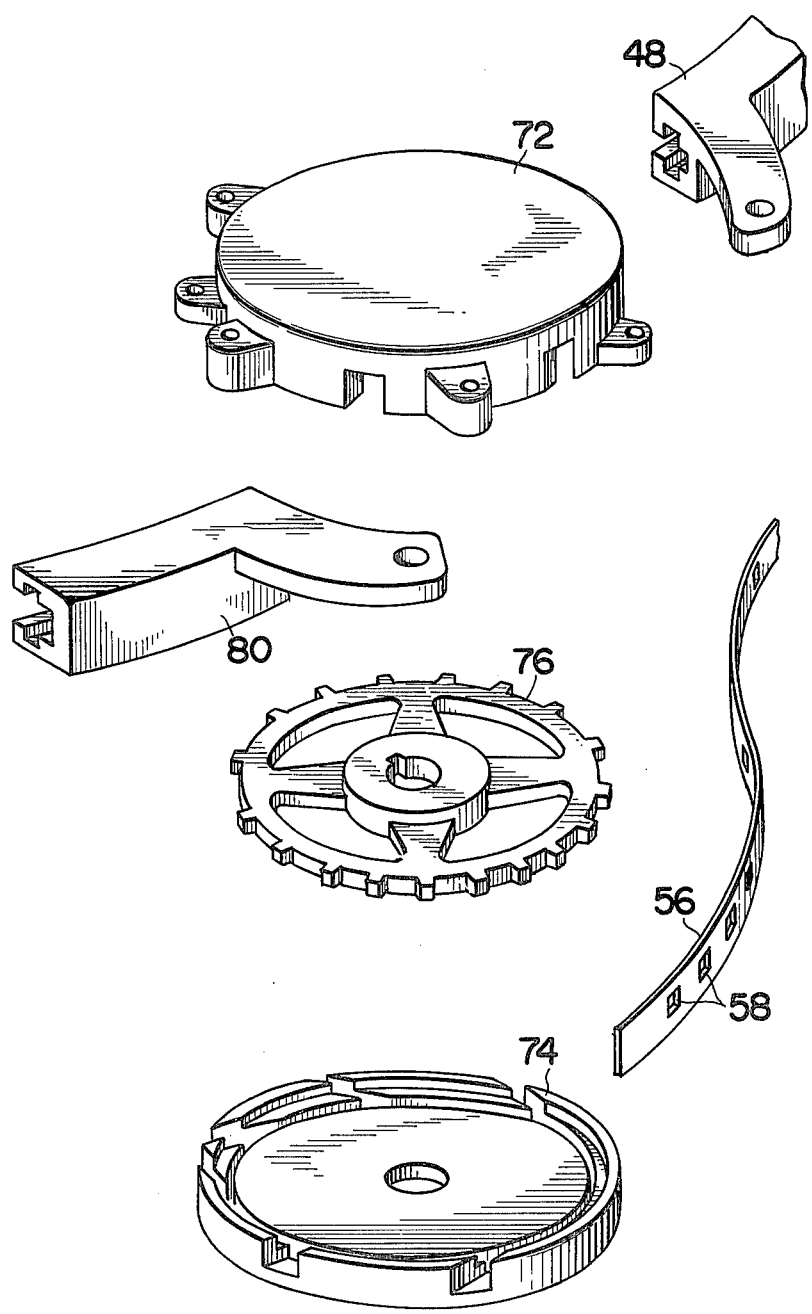
FIG. 5 is an exploded oblique view which illustrates the sprocket wheel and housing.

As is shown in FIG. 4, the guide rail 42 is fastened to a roof side member 46 of the vehicle by means of the fastening screws 44. Furthermore, guide arms 48 and 50 which are roughly U-shaped in cross section extend from both edges of the guide rail in a direction perpendicular to the length of the guide rail. The runner piece 30 and the runner gear 40 are accommodated between the guide arms 48 and 50. Furthermore, a rectangular groove 52 is formed inside one of the guide arms 48. Slide grooves 54 which substantially increase the width of the rectangular groove 52 are formed at an intermediate depth in both walls of the rectangular groove 52. A thick tape 56 is provided within the slide grooves 54 so that it is free to slide in the direction of its length. As is shown in FIG. 5, a plurality of openings 58 are formed along the length of the thick tape 56. As is shown in FIG. 3, the runner gear 40 engages with the openings 58 in the thick tape 56. It is desirable that the thick tape 56 be manufactured from a synthetic resin. By leaving only a slight space between the thick tape 56 and the slide grooves 54 when the tape 56 is inserted into the grooves 54, the system can be arranged so that the thick tape 56 can transmit not only a tensile force but also a compressive force along its entire length.

The tip ends of the guide arms 48 and 50 of the guide rail 42 are formed into rail parts 60 and 62 whose surfaces are hemispherical in cross section. A ring groove 64 formed in an integral extension of the runner gear 40 fits over the rail parts 60 and 62. Furthermore, as is shown in FIG. 3, a guide gear 66 consisting of rectangular blocks which project at regular intervals toward the interior of the guide rail 42 are formed on the interior surface of the guide arm 50. The guide gear 66 engages with the runner gear 40. Thus, the guide gear 66 and the slide grooves 54 which accommodate the thick tape are formed on opposite sides of the runner gear 40 so that the runner gear 40 is held between the thick tape 56 and the guide gear 66.

When the thick tape 56 moves within the slide grooves 54 in a direction of its length, the runner gear 40 is caused to revolve. When the runner gear 40 revolves about the runner piece 30, it thereby causes the runner piece 30 to move along the length of the guide rail 42 since the guide rail 66 is fixed to the guide rail 42. As is shown in FIG. 1, the intermediate portion of the guide rail 42 is fastened to the roof side member 46 of the vehicle and is oriented in a roughly horizontal direction. The front portion of the guide rail 42 drops along the front pillar 68 of the vehicle while the rear portion of the guide rail 42 drops vertically along the center pillar 70 of the vehicle and ends at an intermedaite point on the center pillar 70.

The guide arm 48 extends vertically downward beyond the end of the guide rail 42 which is dropped vertically along the center pillar 70. This guide arm 48 connects to a sprocket housing 72 which is fastened to the lower part of the central pillar 70. As is shown in FIG. 5, a sprocket wheel 76 is provided in the sprocket housing 72 between the sprocket housing 72 and a housing cover 74. The thick tape 56 which has passed through the guide arm 48 engages with the sprocket wheel 76 inside the sprocket housing 72. Furthermore, the output shaft of the motor 78 which is fastened to the center pillar 70 is coupled to the sprocket wheel 76 so that the driving force of the motor 78 is transmitted to the sprocket wheel 76.

The motor 78 is a reversible motor and is caused to run when it detects that a passenger is entering or leaving the vehicle. For example, when the passenger opens the door in order to enter the vehicle, the motor 78 causes the sprocket wheel 76 to complete a specified number of revolutions in a counterclockwise direction; while when the passenger closes the door after seating himself in the motor vehicle, the motor 78 causes the sprocket wheel 76 to complete a specified number of revolutions in a clockwise direction.

Furthermore, a second guide arm 80 is connected to the sprocket housing 72. The excess thick tape 56 which is pushed out of the sprocket housing 72 passes through the second guide arm 80.

In FIG. 1, the belt 10 indicated by the solid line is fastened about the passenger; i.e. the passenger 14 is wearing the belt 10 diagonally across his body. In operation under normal vehicle operating condition, the specified retracting force of the retractor mechanism 20 allows the extension of the inner end 16 of the belt 10. Accordingly, the passenger can freely adjust his driving posture.

Furthermore, if the vehicle becomes involved in a hazardous condition such as a collision, etc., the retractor mechanism 20 instantly stops the extension of the inner end 16 of the belt 10. Meanwhile, the outer end 22 of the belt 10 is anchored to a vertical portion of the guide rail 42 via the anchor plate 24 and the runner piece 30 so that movement of the outer end 22 of the belt 10 in a horizontal direction is prevented. Accordingly, the passenger is securely restrained by the belt 10 so that his safety is ensured.

When the passenger opens the door in order to leave the vehicle after he has finished driving the vehicle, the motor 78 causes the sprocket wheel 76 to rotate in a counterclockwise direction with respect to FIG. 1. As a result, the thick tape 56 is pushed out of the sprocket housing 72 toward the guide rail 42 so that the runner gear 40 is caused to rotate in a counterclockwise direction with respect to FIG. 3. As the runner gear 40 rotates, it changes its position of engagement with the guide gear 66. As a result, the runner gear 40 climbs through the vertical portion of the guide rail 42 and moves toward the front of the vehicle. Therefore, as is indicated by the two-dot chain line in FIG. 1, a space is formed for the passenger to leave the vehicle between the belt 10 and the passenger seat 12. In this way, the belt 10 is automatically unfastened and the passenger can easily and comfortably leave the vehicle.

When the passenger closes the door after reentering the vehicle and seating himself in the passenger seat, the motor 78 is reversed and the runner gear 40 rotates in the opposite direction. As a result, the belt 10 is once again automatically fastened about the passenger as indicated by the solid line in FIG. 1. During the movement of the runner gear 40, the runner piece 30 is in rolling contact with the guide rail 42. Therefore, the operating noise of the system is greatly reduced and there is little danger that the noise wll disturb the passenger. Furthermore, since the runner piece 30 and the running gear 40 rotate, the belt 10 can be smoothly guided and moved even when the guide rail 42 is bent at a slight curvature.

As described above, the seatbelt system provided by the present invention uses a rotating runner gear 40. Accordingly, this invention has advantages as follows: The system as a whole and particularly the guide rail is conspicuously reduced in size and as a result, the projection of parts into the passenger compartment is reduced; furthermore, the design of the system is simple and the operating noise is reduced.

Furthermore, in the embodiment described above, this invention was applied to a seatbelt system which had a vertically oriented guide rail section. However, the present invention is not limited to such a seatbelt system and it can also be applied to seatbelt systems in which a locking device is installed at a specified point on the guide rail.

It should be apprent to one skilled in the art that the above-described embodiments are merely illustrative of but one of the many possible specific embodiments which represent the application of the principles of the present invention. Numerous and varied other arrangements can be readily deivsed by those skilled in the art without departing from the spirit and scope of the invention.

We claim:

1. A seatbelt system for a motor vehicle which automatically fastens the passenger restraining belt around and removes the belt from a passenger which includes a guide means coupled to an outer end of said passenger restraining belt for guiding said outer end longitudinally along an interior roof side member of said motor vehicle, a flexible tape having a plurality of apertures therein which cooperates with said guide means to cause said guide means to move longitudinally and a driving mechanism for driving said flexible tape, said guide means comprises:

- a runner piece which anchors said outer end of said passenger restraining belt;
- a runner gear which is rotatably coupled to said runner piece, said runner gear engaging with said plurality of apertures in said flexible tape;
- a guide rail fastened to said vehicle body for guiding said runner piece along the length of said guide rail; and
- a linear guide gear provided in said guide rail which engages with said runner gear whereby movement of said flexible tape causes said runner gear to rotate and said runner piece to move along said guide rail.

2. A seatbelt system according to claim 1, wherein said runner piece is cylindrical in shape and said runner gear rotatably coupled to the circumference of said runner piece.

3. A seatbelt system according to claim 2, wherein said runner piece anchors the belt via an anchor plate.

4. A seatbelt system according to claim 1, further comrpising a ring groove formed in said runner gear and said ring groove is guided by said guide rail.

5. A seatbelt system according to claim 1, wherein an intermediate portion of said guide rail is fastened to said roof side member of said vehicle and is oriented so that it is parallel to the longitudinal axis of said vehicle.

6. A seatbelt system according to claim 5, wherein one end of said guide rail is dropped vertically along a center pillar of said vehicle.

7. A seatbet system according to claim 5, wherein said guide gear comprises a plurality of rectangular projections provided at regular intervals in said guide rail.

8. A seatbelt system according to claim 5, further comprising guide arms which are roughly U-shaped in cross section extending from both edges of said guide rail and said runner piece is provided within said guide arms.

9. A seatbelt system according to claim 8, wherein grooves are formed in the direction of the length of said guide rail in one of said guide arms of said guide rail and said flexible tape is provided within said grooves.

10. A seatbelt system according to claim 1, wherein said driving mechanism comprises a sprocket wheel which engages with and drives said flexible tape.

* * * * *